United States Patent
Evertsson

(10) Patent No.: US 12,082,036 B2
(45) Date of Patent: Sep. 3, 2024

(54) LAYER ONE EXECUTION CONTROL

(71) Applicant: Telefonaktiebolaget LM Ericsson (publ), Stockholm (SE)

(72) Inventor: Rickard Evertsson, Lund (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 318 days.

(21) Appl. No.: 17/627,003

(22) PCT Filed: Jul. 17, 2019

(86) PCT No.: PCT/EP2019/069276
§ 371 (c)(1),
(2) Date: Jan. 13, 2022

(87) PCT Pub. No.: WO2021/008704
PCT Pub. Date: Jan. 21, 2021

(65) Prior Publication Data
US 2022/0256391 A1      Aug. 11, 2022

(51) Int. Cl.
*H04W 28/02* (2009.01)
*H04W 24/08* (2009.01)
(Continued)

(52) U.S. Cl.
CPC ....... *H04W 28/0221* (2013.01); *H04W 24/08* (2013.01); *H04W 52/0216* (2013.01); *H04W 84/18* (2013.01)

(58) Field of Classification Search
None
See application file for complete search history.

(56) References Cited

U.S. PATENT DOCUMENTS 11,265,927 B1 *   3/2022   Chu ............... H04W 74/085
11,296,840 B1 *   4/2022   Jiang ............. H04W 72/23
(Continued)

FOREIGN PATENT DOCUMENTS

EP    2721880 B1    1/2019
WO    2015193796 A1   12/2015

OTHER PUBLICATIONS

International Search Report and Written Opinion dated Jul. 1, 2020 for International Application No. PCT/EP2019/069276 filed Jul. 17, 2020, consisting of 16-pages.
(Continued)

*Primary Examiner* — Anh Vu H Ly
(74) *Attorney, Agent, or Firm* — Weisberg I.P. Law, P.A.

(57) ABSTRACT

A method of controlling layer one, L1, execution for a communication node associated with two or more L1 execution instances is disclosed. The communication node is configured to communicate with one or more communication devices and to operate according to a communication scheme defining radio resource units representing indivisible communication units of a radio access interface of the communication node. The method includes allocating respective L1 execution of at least two non-overlapping parts of a single radio resource unit to different ones of the two or more L1 execution instances. The method also includes sending a respective control signal to the different ones of the two or more L1 execution instances, wherein each respective control signal is indicative of the corresponding part of the single radio resource unit. Corresponding apparatus, arrangement, communication node and computer program product are also disclosed.

11 Claims, 2 Drawing Sheets

(51) Int. Cl.
*H04W 52/02* (2009.01)
*H04W 84/18* (2009.01)

(56) References Cited

U.S. PATENT DOCUMENTS

| | | |
|---|---|---|
| 2012/0210325 A1 | 8/2012 | de Lind van Wijngaarden et al. |
| 2016/0021499 A1 | 1/2016 | Viswanadham |
| 2016/0105786 A1* | 4/2016 | Suryavanshi ........... H04L 67/54 |
| | | 455/434 |
| 2017/0295409 A1* | 10/2017 | Simon ....................... H04L 9/40 |
| 2020/0037324 A1* | 1/2020 | Chu ..................... H04L 1/0057 |
| 2020/0037357 A1* | 1/2020 | Chu ..................... H04L 1/0004 |
| 2020/0107393 A1* | 4/2020 | Chu ..................... H04L 1/0003 |
| 2020/0204399 A1* | 6/2020 | Crayford ........... H04L 12/40045 |
| 2020/0229214 A1* | 7/2020 | Zhang ............... H04W 72/0453 |

OTHER PUBLICATIONS

3GPP TSG-RAN WG1 NR AdHoc R1-1700814; Title: L1 Broadcast Control Channel; Agenda Item: 5.1.3.1; Source: Qualcomm Incorporated; Document for: Discussion/Decision; Date and Location: Jan. 16-20, 2017, Spokane, USA, consisting of 2-pages.

* cited by examiner

LAYER ONE EXECUTION CONTROL

CROSS-REFERENCE TO RELATED APPLICATIONS

This application is a Submission Under 35 U.S.C. § 371 for U.S. National Stage Patent Application of International Application Number: PCT/EP2019/069276, filed Jul. 17, 2019 entitled "LAYER ONE EXECUTION CONTROL," the entirety of which is incorporated herein by reference.

TECHNICAL FIELD

The present disclosure relates generally to the field of controlling execution for a communication node. More particularly, it relates to controlling layer one, L1, execution for a communication node.

BACKGROUND

Efficient execution (e.g., in terms of hardware utilization and/or power consumption) is typically desirable for layer one, L1, processing for a communication transmitter/receiver. Additionally or alternatively, it may be desirable that the L1 processing enable meeting of one or more latency requirements. Furthermore, it may be desirable to keep the amount of signalling over interfaces at a low level when L1 processing is executed for a communication transmitter and/or receiver.

Therefore, there is a need for approaches to control L1 execution for a communication node.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a method of controlling layer one, L1, execution for a communication node associated with two or more L1 execution instances. The communication node is configured to communicate with one or more communication devices and to operate according to a communication scheme defining radio resource units representing indivisible communication units of a radio access interface of the communication node.

The method comprises allocating respective L1 execution of at least two non-overlapping parts of a single radio resource unit to different ones of the two or more L1 execution instances, and sending a respective control signal to the different ones of the two or more L1 execution instances, wherein each respective control signal is indicative of the corresponding part of the single radio resource unit.

In some embodiments, the method further comprises determining non-overlapping parts of the single radio resource unit by letting sub-units of the single radio resource unit that carry data of a same content service belong to a same part of the single radio resource unit, and/or letting sub-units of the single radio resource unit that carry data of different content services belong to different non-overlapping parts of the single radio resource unit.

In some embodiments, the method further comprises determining non-overlapping parts of the single radio resource unit by letting sub-units of the single radio resource unit that carry data of a same communication device belong to a same part of the single radio resource unit, and/or letting sub-units of the single radio resource unit that carry data of different communication devices belong to different non-overlapping parts of the single radio resource unit.

In some embodiments, the method further comprises determining non-overlapping parts of the single radio resource unit by letting sub-units of the single radio resource unit that carry data of a same logical channel belong to a same part of the single radio resource unit, and/or letting sub-units of the single radio resource unit that carry data of different logical channels belong to different non-overlapping parts of the single radio resource unit.

In some embodiments, wherein a first L1 execution instance is capable of performing L1 processing faster than a second L1 execution instance, allocating respective L1 execution of the non-overlapping parts of the single radio resource unit comprises allocating L1 execution of a first part that carry data associated with a first acceptable latency to the first L1 execution instance and allocating L1 execution of a second part that carry data associated with a second acceptable latency to the second L1 execution instance, when the first acceptable latency is lower than the second acceptable latency.

In some embodiments, wherein a third L1 execution instance is logically closer to a radio unit of the communication node than a fourth L1 execution instance, allocating respective L1 execution of the non-overlapping parts of the single radio resource unit comprises allocating L1 execution of a third part that carry data associated with a third acceptable latency to the third L1 execution instance and allocating L1 execution of a fourth part that carry data associated with a fourth acceptable latency to the fourth L1 execution instance, when the third acceptable latency is lower than the fourth acceptable latency.

In some embodiments, the method further comprises disabling one or more of the L1 execution instances when a traffic load of the communication node falls below a load threshold value.

In some embodiments, disabling one or more of the L1 execution instances comprises disabling L1 execution instances having a highest power consumption among the two or more L1 execution instances.

In some embodiments, disabling one or more of the L1 execution instances comprises disabling L1 execution instances that utilize hardware usable, during L1 execution of the single radio resource unit, for other radio resource unit processing purposes than L1 execution.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an apparatus for controlling layer one, L1, execution for a communication node associated with two or more L1 execution instances, wherein the communication node is configured to communicate with one or more communication devices and to operate according to a communication scheme defining radio resource units representing indivisible communication units of a radio access interface of the communication node.

The apparatus comprises a controller configured to cause allocation of respective L1 execution of at least two non-overlapping parts of a single radio resource unit to different ones of the two or more L1 execution instances, and sending of a respective control signal to the different ones of the two or more L1 execution instances, wherein each respective control signal is indicative of the corresponding part of the single radio resource unit.

A fourth aspect is an arrangement for controlling layer one, L1, execution for a communication node associated with two or more L1 execution instances, wherein the communication node is configured to communicate with one or more communication devices and to operate according to a communication scheme defining radio resource units representing indivisible communication units of a radio access interface of the communication node. The arrangement comprises the apparatus according to the third aspect and another apparatus comprising one or more of the L1 execution instances.

A fifth aspect is a communication node comprising the apparatus of the third aspect and/or the arrangement of the fourth aspect.

In some embodiments, any of the above aspects may additionally have features identical with or corresponding to any of the various features as explained above for any of the other aspects.

An advantage of some embodiments is that approaches are provided for control of L1 execution for a communication node.

Some embodiments provide for efficient execution (e.g., in terms of hardware utilization and/or power consumption) of L1 processing for a communication transmitter/receiver.

Some embodiments enable meeting of one or more latency requirements.

Some embodiments keep the amount of signalling over interfaces at an acceptable level when L1 processing is executed for a communication transmitter/receiver.

One advantage of some embodiments is that the aggregated processing capacity is increased by using more than one L1 execution instances.

One advantage of some embodiments is that the aggregated processing capacity is flexible due to the possibility to enable/disable L1 execution instances.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described where approaches are provided for control of L1 execution for a communication node.

Figure 1:
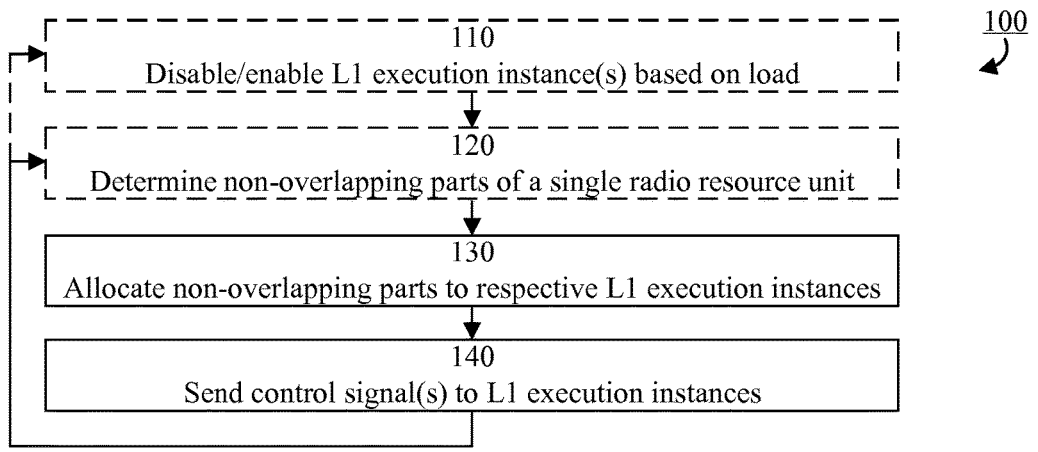
FIG. 1 is a flowchart illustrating example method steps according to some embodiments.

FIG. 1 illustrates an example method 100 according to some embodiments. The method is for controlling layer one, L1, execution for (e.g., of or in) a communication node associated with (e.g., comprising or operatively connected to) two or more L1 execution instances. The communication node may, for example, be an access node and/or a network node, such as a base station.

Generally, an L1 execution instance may be any hardware or software entity (or collection of entities) that is configured to perform L1 processing. An L1 execution instance may be seen as an instantiation of a L1 PHY processor, where PHY refers to physical layer.

The communication node is configured to communicate with one or more communication devices. A communication device may, for example, be a user device, such as a user equipment (UE).

The communication node is configured to operate according to a communication scheme defining radio resource units representing indivisible communication units of a radio access interface of the communication node. Typically, an indivisible communication unit may be defined in terms of a frequency domain unit and/or a time domain unit. For example, an indivisible communication unit may be defined as a (single) slot of orthogonal frequency division multiplexing (OFDM) symbols.

In optional step 110, one or more of the L1 execution instances may be disabled or enabled. Typically, disabling/enabling of L1 execution instances may be based on an assessment of how many and/or which L1 execution instances will be used for upcoming processing of a particular single radio resource unit.

For example, one or more of the L1 execution instances may be disabled when a traffic load of the communication node falls below a load threshold value. In some embodiments, several load threshold values may be provided and a particular number of the L1 execution instances may be disabled when a traffic load of the communication node falls below a particular load threshold value.

For example, a first number of the L1 execution instances may be disabled when a traffic load of the communication node falls below a first load threshold value and a second number of the L1 execution instances may be disabled when a traffic load of the communication node falls below a second load threshold value, wherein the first number is higher than the second number when the first load threshold value is lower than the second load threshold value.

In some embodiments, one or more L1 execution instances having a highest power consumption among the two or more L1 execution instances (i.e., having a power consumption that is higher than respective power consumptions of other L1 execution instances) are disabled.

In some embodiments, one or more L1 execution instances that utilize hardware which is usable (during L1 execution of the single radio resource unit) for other radio resource unit processing purposes than L1 execution are disabled.

In some embodiments, one or more L1 execution instances are disabled that utilize hardware which is usable (during L1 execution of the single radio resource unit) for other radio resource unit processing purposes than L1 execution, and which have a highest power consumption among such L1 execution instances.

In optional step 120, non-overlapping parts of the single radio resource unit are determined for allocation. Each non-overlapping part may relate to data of the same communication device and/or to data of the same content service and/or to data of a same logical channel. For example, each non-overlapping part may be the largest possible part that relates to data of the same communication device and/or to data of the same content service and/or to data of a same logical channel.

For example, step 120 may comprise:
letting (e.g., all) sub-units of the single radio resource unit that carry data of a same content service belong to a same part of the single radio resource unit, and/or
letting sub-units of the single radio resource unit that carry data of different content services belong to different non-overlapping parts of the single radio resource unit, and/or
letting (e.g., all) sub-units of the single radio resource unit that carry data of a same communication device belong to a same part of the single radio resource unit, and/or
letting sub-units of the single radio resource unit that carry data of different communication devices belong to different non-overlapping parts of the single radio resource unit, and/or
letting (e.g., all) sub-units of the single radio resource unit that carry data of a same logical channel belong to a same part of the single radio resource unit, and/or
letting sub-units of the single radio resource unit that carry data of different logical channels belong to different non-overlapping parts of the single radio resource unit.

When an indivisible communication unit, and thus the single radio resource unit, is defined as a single slot of OFDM symbols, the sub-units may be defined by the time duration of a single OFDM symbol and the frequency interval of a single sub-carrier.

In step 130, respective L1 execution of at least two non-overlapping parts of a single radio resource unit is allocated to different ones of the two or more L1 execution instances.

It should be noted that two or more of the non-overlapping parts may have their L1 execution allocated to the same L1 execution instances in some scenarios, and/or that none of the non-overlapping parts may have their L1 execution allocated to the same L1 execution instances in some scenarios.

The method may comprise that at least two of the non-overlapping parts always have their L1 execution allocated to different L1 execution instances, or that at least two of the non-overlapping parts at least sometimes have their L1 execution allocated to different L1 execution instances (e.g., when the traffic load exceeds a load threshold value).

The allocation of non-overlapping parts L1 execution instances may be based on latency requirements of the data carried in the non-overlapping parts.

For example, when a first L1 execution instance is capable of performing L1 processing faster than a second L1 execution instance, L1 execution of a first part that carry data associated with a first acceptable latency may be allocated to the first L1 execution instance and L1 execution of a second part that carry data associated with a second acceptable latency may be allocated to the second L1 execution instance, when the first acceptable latency is lower than the second acceptable latency. This can be interpreted as that L1 execution of a part carrying data associated with low latency requirements is allocated to an L1 execution instance that is capable of fast L1 processing; and vice versa.

Alternatively or additionally, when a third L1 execution instance is logically closer to a radio unit of the communication node than a fourth L1 execution instance, L1 execution of a third part that carry data associated with a third acceptable latency may be to the third L1 execution instance and L1 execution of a fourth part that carry data associated with a fourth acceptable latency may be allocated to the fourth L1 execution instance, when the third acceptable latency is lower than the fourth acceptable latency. This can be interpreted as that L1 execution of a part carrying data associated with low latency requirements is allocated to an L1 execution instance that logically close to a radio unit of the communication node; and vice versa. That an L1 execution instance is logically close to a radio unit of the communication node may be interpreted as the L1 execution instance appearing early in a receiver and/or transmitter processing chain of the communication node.

In step 140, a respective control signal is sent to the different ones of the two or more L1 execution instances. Each respective control signal is indicative of the corresponding part of the single radio resource unit.

For example, different control signals may be sent to each of the two or more L1 execution instances (indicating only the corresponding part to be processed by the particular L1 execution instance), or the same control signal may be sent to all of the two or more L1 execution instances (indicating the corresponding part to be processed by each of the L1 execution instances).

That the respective control signal is indicative of the corresponding part of the single radio resource unit may, for example, be implemented by the control signal comprising an identifier of the corresponding part (e.g., indices of the sub-units comprised in the part).

Thus, the example method 100 provides an approach to enable several L1 execution instances to process different parts of a single communication resource unit.

Figure 2:
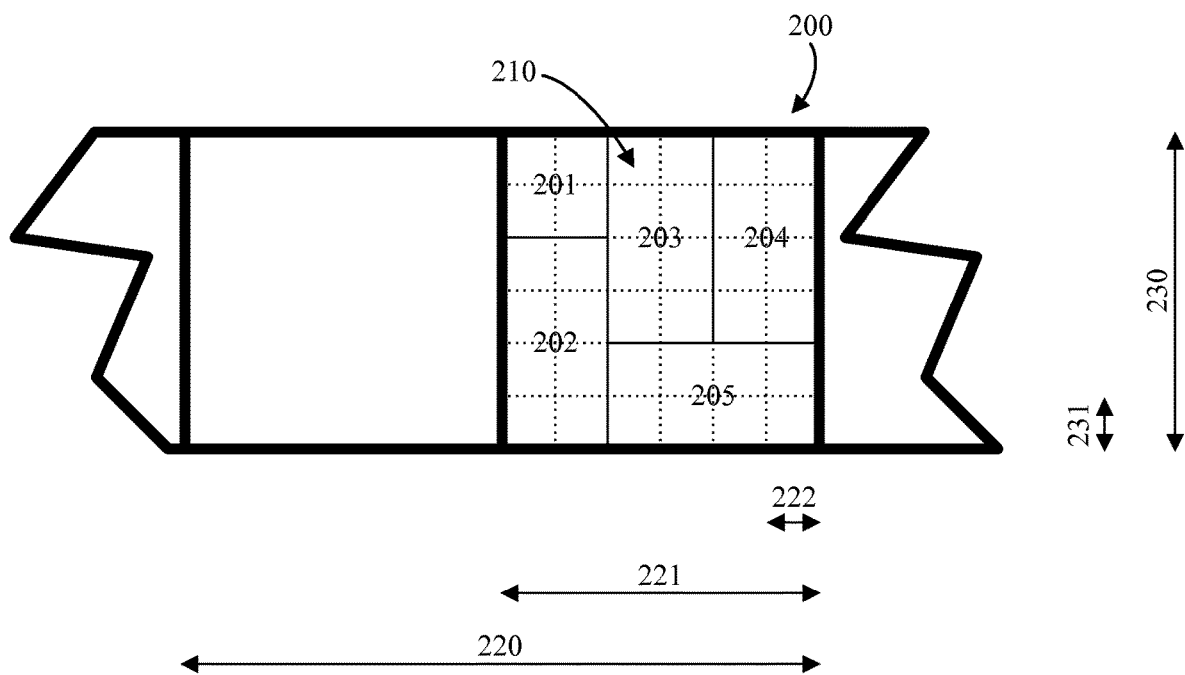
FIG. 2 is a schematic drawing illustrating an example radio resource unit according to some embodiments.

FIG. 2 schematically illustrates an example radio resource unit 200 according to some embodiments. The example radio resource unit 200 has an extension 221 in a time domain and an extension 230 in a frequency domain. Furthermore, the example radio resource unit 200 comprises a plurality of sub-units 210, wherein each subunit has an extension 222 in a time domain and an extension 231 in a frequency domain.

For example, the radio resource unit 200 may be defined by a single slot of OFDM symbols. Then, the extension 221 may correspond to a slot duration, the extension 230 may correspond to a collection of sub-carriers used for the OFDM transmission, the sub-units 210 may correspond to resource elements, the extension 222 may correspond to an OFDM symbol duration, the extension 231 may correspond to one sub-carrier used for the OFDM transmission, and the slot may be part of a sub-frame having a duration 220.

In fifth generation new radio (5G NR) a slot consists of 14 OFDM symbols transmitted over 12 sub-carriers. In long term evolution (LTE) a slot consists of 7 OFDM symbols transmitted over 12 sub-carriers.

Typically, different parts 201, 202, 203, 204, 205 of the radio resource unit 200 may be used to carry data relating to different communication devices, and/or different content services, and/or different logical channels. Such part may be determined (compare with step 120 of FIG. 1) and allocated to L1 execution instances (compare with step 130 of FIG. 1).

Figure 3:
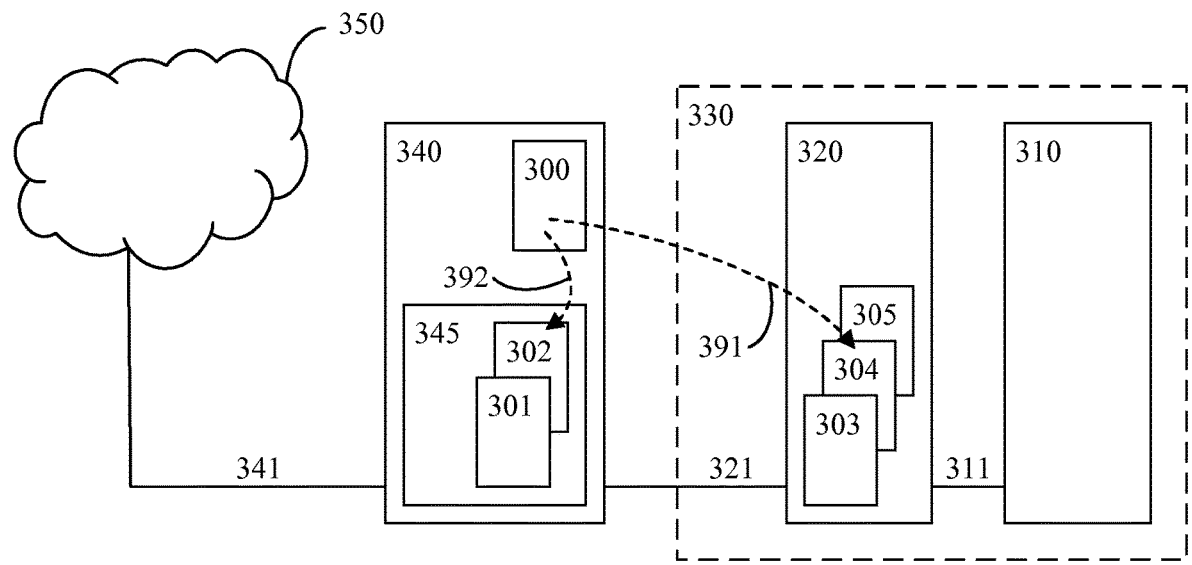
FIG. 3 is a schematic block diagram illustrating an example arrangement according to some embodiments.

FIG. 3 schematically illustrates an example arrangement according to some embodiments. The arrangement comprises a radio unit 310, a baseband unit 320, a general purpose processing unit 340, and a plurality of L1 execution instances 301, 302, 303, 304, 305. The radio unit 310 connected to the baseband unit 320 via an interface 311, and the baseband unit 320 is connected to the general purpose processing unit 340 via an interface 321. The general purpose processing unit 340 may also be operatively connected to a cloud-processing arrangement 350 via an interface 341.

The baseband processing unit 320 comprises some of the L1 execution instances 303, 304, 305, and the general purpose processing unit 340 comprises some of the L1 execution instances 301, 302. The L1 execution instances 301, 302 comprised in the general purpose processing unit 340 may view the radio unit 310 and the baseband unit 320 as a virtual radio unit 330.

The general purpose processing unit 340 may be configured to perform layer two, L2, and/or layer three, L3, processing, but may additionally comprise a (physical or virtual) L1 processing unit 345. Typically, the L1 execution instances 301, 302 are comprised in the L1 processing unit 345.

The arrangement is for controlling layer one, L1, execution for a communication node associated with the L1 execution instances 301, 302, 303, 304, 305. To this end, the general purpose processing unit 340 comprises a controller (e.g., control circuitry or a control module) 300. The controller 300 may, for example, be configured to cause execution of one or more of the method steps as described in connection with FIG. 1.

At least some parts of the arrangement (e.g., one or more of the radio unit 310, the baseband unit 320, and the general purpose processing unit 340) may be comprised in the communication node according to some embodiments.

The communication node is configured to communicate with one or more communication devices (not shown) and to operate according to a communication scheme defining radio resource units representing indivisible communication units of a radio access interface of the communication node.

The controller 300 is configured to cause allocation of respective L1 execution of at least two non-overlapping parts of a single radio resource unit to different ones of the L1 execution instances 301, 302, 303, 304, 305 (compare with step 130 of FIG. 1).

The controller 300 is also configured to cause sending of a respective control signal 391, 392 to the different ones of the L1 execution instances, wherein each respective control signal is indicative of the corresponding part of the single radio resource unit (compare with step 140 of FIG. 1).

The controller 300 may also be configured to cause determination of the non-overlapping parts of the single radio resource unit (compare with step 120 of FIG. 1).

The controller 300 may also be configured to cause enabling/disabling of one or more of the L1 execution instances 301, 302, 303, 304, 305, e.g., when a traffic load of the communication node falls below a load threshold value (compare with step 110 of FIG. 1).

Figure 4:
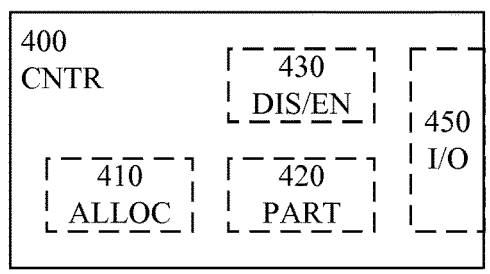
FIG. 4 is a schematic block diagram illustrating an example apparatus according to some embodiments.

FIG. 4 schematically illustrates an example apparatus according to some embodiments. The example apparatus may be a controller (CNTR; e.g., control circuitry or a control module) 400. The controller 400 may be used as the controller 300 of FIG. 3. The controller 400 may, for example, be configured to cause execution of one or more of the method steps as described in connection with FIG. 1.

The controller 400 is configured to cause allocation of respective L1 execution of at least two non-overlapping parts of a single radio resource unit to different ones of the L1 execution instances (compare with step 130 of FIG. 1).

To this end, the controller may comprise, or be otherwise associated with (e.g., operatively connected, or connectable, to) an allocator (ALLOC; e.g., allocation circuitry or an allocation module) 410. The allocator may be configured to allocate respective L1 execution of at least two non-overlapping parts of a single radio resource unit to different ones of the L1 execution instances.

The controller 400 is also configured to cause sending of a respective control signal to the different ones of the L1 execution instances, wherein each respective control signal is indicative of the corresponding part of the single radio resource unit (compare with step 140 of FIG. 1).

To this end, the controller may comprise, or be otherwise associated with (e.g., operatively connected, or connectable, to) an interface (I/O; e.g., interface circuitry or an interface module) 450. The interface may be configured to send the respective control signal(s) to the different ones of the L1 execution instances.

The controller 400 may also be configured to cause determination of the non-overlapping parts of the single radio resource unit (compare with step 120 of FIG. 1).

To this end, the controller may comprise, or be otherwise associated with (e.g., operatively connected, or connectable, to) a partitioner (PART; e.g., partition circuitry or a partition module) 420. The partitioner may be configured to determine the non-overlapping parts of the single radio resource unit.

The controller 400 may also be configured to cause enabling/disabling of one or more of the L1 execution instances, e.g., when a traffic load of the communication node falls below a load threshold value (compare with step 110 of FIG. 1).

To this end, the controller may comprise, or be otherwise associated with (e.g., operatively connected, or connectable, to) a disabler/enabler (DIS/EN; e.g., disabling/enabling circuitry or a disabling/enabling module) 430. The disabler/enabler may be configured to enable/disable the L1 execution instances.

Generally, disabling of a L1 execution instance may, for example, comprise turning the L1 execution instance off completely, setting the L1 execution instance in a sleep mode, cutting or reducing the power supply to the L1 execution instance, and/or allocating the L1 execution instance to other tasks.

Various embodiments and their context will now be further exemplified in relation to an example fifth generation new radio (5G NR) implementation. The example implementation may, for example, be for an access node such as a base station. It should be noted that describing embodiments in the context of the example implementation is merely for illustration, and that embodiments may be equally applicable to other implementations and/or public deployments.

The example implementation comprises a radio unit (RU; compare with 310 of FIG. 3) and a baseband unit (BB; compare with 320 of FIG. 3) for layer one, L1, processing of antenna data. Layer two, L2, is deployed on a general purpose computer (compare with 340 of FIG. 3) and layer three, L3, is executed in the cloud (compare with 350 of FIG. 3) for the example implementation. Communication between RU and BB is performed using a common public radio interface (CPRI) protocol, communication between BB and general purpose computer is performed using an Ethernet protocol, and communication between general purpose computer and cloud is performed using a user datagram protocol-Internet protocol (UDP/IP).

Typically, an example uplink processing flow (control and reception of physical uplink shared channel, PUSCH) comprises:

L2 scheduling UE:s for one or more slots. Referring to FIG. 2, different UE:s may be scheduled in different ones of the parts 201, 202, 203, 204, 205, for example.

L2 sending the scheduling information (allocation) to L1 to provide information regarding how incoming data should be decoded.

RU continuously transmitting antenna data over CPRI to BB for L1 processing.

L1 using the scheduling information when decoding the incoming data from RU.

L1 sending each decoded transport block to L2.

In some implementations there may be an additional L1 PHY processing instance in the general purpose computer (compare with 340 of FIG. 3). In such a setup, the RU may either be directly connected to the general purpose computer, or the RU may be operatively connected to the general purpose computer via the BB (see setup of FIG. 3).

In the latter case, the antenna data may be transmitted to the general purpose computer using an enhanced CPRI (eCPRI) protocol (compare with 321 of FIG. 3).

Implementations where L1 PHY processing is performed in a general purpose computer may experience one or more of the following example problems:

The baseband unit will be left with its processing resources under-utilized or un-utilized.

The amount of signalling between the baseband unit and the general purpose computer may increase since un-decoded data (e.g., OFDM symbols) needs to be transferred instead of decoded transport blocks. This may typically result in increased latency before L1 processing is started.

Generally, there may be increased latency before L1 processing is started due to that L1 processing is performed further from the radio (e.g., in terms of physical distance and/or signal transfer time). It may be cumbersome to meet low latency requirements (e.g., for ultra-reliable low latency communications, URLLC, signals) under such circumstances.

Processing by the general purpose computer may consume more power than processing by the baseband unit.

To solve one or more of these or other problems, embodiments suggest distributed L1 processing. As elaborated on above, two or more L1 execution instances are utilized for this purpose. The L1 execution instances may utilize any resources (hardware and/or software) capable of performing L1 processing (e.g., L1 PHY processing).

Typically, at least one L1 execution instance resides in a baseband unit and at least one L1 execution instance resides in a general purpose computer. Alternatively or additionally, one or more L1 execution instances may reside in the radio unit.

A L1 execution instance of a general purpose computer may, for example, utilize one or more of a graphic processing unit (GPU), a field programmable gate array (FPGA), a soft-stack, and L1 software running on the general purpose computer.

As has been described above, at least two different L1 execution instances are allocated to processing of a single radio resource unit (e.g., a slot) which is an indivisible communication unit of the radio access interface, each L1 execution instance processing a respective part of the single radio resource unit, wherein the parts are non-overlapping. The non-overlapping part may be defined in time and/or frequency domain as exemplified in FIG. 3.

Generally, various embodiments provide a flexible/dynamic approach; e.g., in terms of hardware utilization, power efficiency, and/or latency.

Some advantages of various embodiments include that:

L1 PHY processing can be handled by the most power efficient L1 execution instance. For low traffic scenarios, an L1 execution instance close to the antenna (e.g., in the radio unit) may be preferable. Alternatively, if parts of the radio unit can be shut down in low traffic scenarios, an L1 execution instance residing in the general purpose computer may be preferable.

For full traffic load scenarios, all L1 execution instances may be utilized, which entails that each single L1 execution instance need not be designed for full traffic load; it is enough if the combination of all L1 execution instances can handle full traffic load. This may reduce the cost for each L1 execution instance.

Low latency signals (e.g., URLLC) may have a dedicated L1 execution instance. If the dedicated L1 execution instance resides in the radio unit or in the baseband unit, the signal can be processed as soon as possible and the decoded transport block can be directly transmitted to L2 using high priority flags. If the dedicated L1 execution instance resides in the general purpose computer, the L1 processing may be performed as fast as possible once started and the decoded transport block can be transmitted to L2 almost instantly if L2 resides in the same general purpose computer. In the latter case, the general purpose computer may prepare the resources for handling of the low latency signal already at the scheduling phase, and/or schedule a reply (e.g., an acknowledgement) to the low latency signal.

According to some embodiments, an example uplink processing flow comprises:

L2 scheduling UE:s for one or more slots. Referring to FIG. 2, different UE:s may be scheduled in different ones of the parts 201, 202, 203, 204, 205, for example. The scheduling of UE:s may be used for determination of which L1 execution instance should process which part of each slot. The scheduling of UE:s may be seen as one example of an implementation of step 120 of FIG. 1. The determination of which L1 execution instance should process which part of each slot may be seen as one example of an implementation of step 130 of FIG. 1.

L2 sending the scheduling information (allocation) to the relevant L1 execution instances to provide information regarding how, and by which L1 execution instance, incoming data should be decoded. The sending the scheduling information may be seen as one example of an implementation of step 140 of FIG. 1.

RU continuously transmitting antenna data over CPRI to BB.

BB using the scheduling information to decide whether to perform L1 processing or relay antenna data.

The relevant L1 execution instances using the scheduling information when decoding the incoming data.

L1 sending each decoded transport block to L2; from BB to general purpose computer, or within general purpose computer.

Generally, when an arrangement is referred to herein, it is to be understood as a physical product; e.g., an apparatus. The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a communication node.

Embodiments may appear within an electronic apparatus (such as a communication node) comprising arrangements, circuitry, and/or logic according to any of the embodiments described herein. Alternatively or additionally, an electronic apparatus (such as a communication node) may be configured to perform methods according to any of the embodiments described herein.

Figure 5:
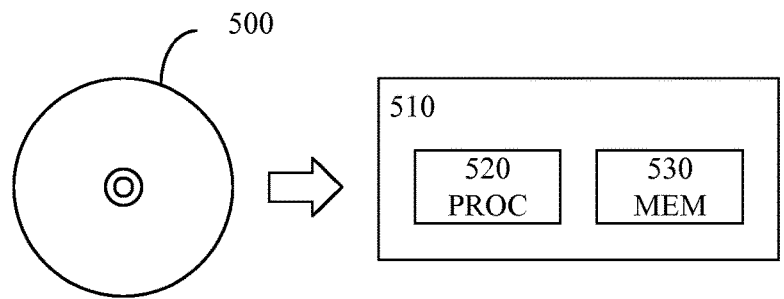
FIG. 5 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 5 illustrates an example computer readable medium in the form of a compact disc (CD) ROM 500. The computer readable medium has stored thereon a computer program comprising program instructions. The computer program is loadable into a data processor (PROC; e.g., data processing circuitry or a data processing unit) 520, which may, for example, be comprised in a communication node 510. When loaded into the data processor, the computer program may be stored in a memory (MEM) 530 associated with or comprised in the data processor. According to some embodiments, the computer program may, when loaded into and run by the data processor, cause execution of method steps according to, for example, any of the methods illustrated in FIG. 1 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method of controlling layer one, L1, execution for a communication node associated with two or more L1 execution instances, the communication node being configured to communicate with one or more communication devices and to operate according to a communication scheme defining radio resource units representing indivisible communication units of a radio access interface of the communication node, the method comprising:

allocating respective L1 execution of at least two non-overlapping parts of a single radio resource unit to different ones of the two or more L1 execution instances; and sending a respective control signal to the different ones of the two or more L1 execution instances, each respective control signal being indicative of the corresponding part of the single radio resource unit; and the allocation based at least on one or more of:

allocating L1 execution of a second part that carry data associated with a second acceptable latency to a second L1 execution instance, when the first acceptable latency is lower than the second acceptable latency when a first L1 execution instance is capable of performing L1 processing faster than a second L1 execution instance, and wherein allocating respective L1 execution of the non-overlapping parts of the single radio resource unit comprises, and allocating L1 execution of a first part that carry data associated with a first acceptable latency to the first L1 execution instance;

allocating L1 execution of a fourth part that carry data associated with a fourth acceptable latency to the fourth L1 execution instance, when the third acceptable latency is lower than the fourth acceptable latency when a third L1 execution instance is logically closer to a radio unit of the communication node than a fourth L1 execution instance, and wherein allocating respective L1 execution of the non-overlapping parts of the single radio resource unit, and allocating L1 execution of a third part that carry data associated with a third acceptable latency to the third L1 execution instance;

disabling one or more of the L1 execution instances when a traffic load of the communication node falls below a load threshold value;

disabling one or more of the L1 execution instances comprises disabling L1 execution instances having a highest power consumption among the two or more L1 execution instances; and disabling one or more of the L1 execution instances comprises disabling L1 execution instances that utilize hardware usable, during L1 execution of the single radio resource unit, for other radio resource unit processing purposes than L1 execution.

2. The method of claim 1, further comprising determining non-overlapping parts of the single radio resource unit by at least one of:

letting sub-units of the single radio resource unit that carry data of a same content service belong to a same part of the single radio resource unit; and letting sub-units of the single radio resource unit that carry data of different content services belong to different non-overlapping parts of the single radio resource unit.

3. The method of claim 1, further comprising determining non-overlapping parts of the single radio resource unit by at least one of:

letting sub-units of the single radio resource unit that carry data of a same communication device belong to a same part of the single radio resource unit; and letting sub-units of the single radio resource unit that carry data of different communication devices belong to different non-overlapping parts of the single radio resource unit.

4. The method of claim 1, further comprising determining non-overlapping parts of the single radio resource unit by at least one of:

letting sub-units of the single radio resource unit that carry data of a same logical channel belong to a same part of the single radio resource unit; and letting sub-units of the single radio resource unit that carry data of different logical channels belong to different non-overlapping parts of the single radio resource unit.

5. A non-transitory computer storage medium storing a computer program comprising program instructions, the computer program being loadable into a data processing unit and configured to cause execution of a method of controlling layer one, L1, execution for a communication node associated with two or more L1 execution instances, the communication node being configured to communicate with one or more communication devices and to operate according to a communication scheme defining radio resource units representing indivisible communication units of a radio access interface of the communication node, the method comprising:

allocating respective L1 execution of at least two non-overlapping parts of a single radio resource unit to different ones of the two or more L1 execution instances; and sending a respective control signal to the different ones of the two or more L1 execution instances, each respective control signal being indicative of the corresponding part of the single radio resource unit; and the allocation based at least on one or more of:

allocating L1 execution of a second part that carry data associated with a second acceptable latency to a second L1 execution instance, when the first acceptable latency is lower than the second acceptable latency when a first L1 execution instance is capable of performing L1 processing faster than a second L1 execution instance, and wherein allocating respective L1 execution of the non-overlapping parts of the single radio resource unit comprises, and allocating L1 execution of a first part that carry data associated with a first acceptable latency to the first L1 execution instance;

allocating L1 execution of a fourth part that carry data associated with a fourth acceptable latency to a fourth L1 execution instance, when the third acceptable latency is lower than the fourth acceptable latency when a third L1 execution instance is logically closer to a radio unit of the communication node than a fourth L1 execution instance, and wherein allocating respective L1 execution of the non-overlapping parts of the single radio resource unit, and allocating L1 execution of a third part that carry data associated with a third acceptable latency to the third L1 execution instance;

disabling one or more of the L1 execution instances when a traffic load of the communication node falls below a load threshold value;

disabling one or more of the L1 execution instances comprises disabling L1 execution instances having a highest power consumption among the two or more L1 execution instances; and disabling one or more of the L1 execution instances comprises disabling L1 execution instances that utilize hardware usable, during L1 execution of the single radio resource unit, for other radio resource unit processing purposes than L1 execution.

6. An apparatus for controlling layer one, L1, execution for a communication node associated with two or more L1 execution instances, the communication node being configured to communicate with one or more communication devices and to operate according to a communication scheme defining radio resource units representing indivisible communication units of a radio access interface of the communication node, the apparatus comprising a controller configured to cause:

allocation of respective L1 execution of at least two non-overlapping parts of a single radio resource unit to different ones of the two or more L1 execution instances; and sending of a respective control signal to the different ones of the two or more L1 execution instances, each respective control signal being indicative of the corresponding part of the single radio resource unit; and the allocation based at least on one or more of:

allocating L1 execution of a second part that carry data associated with a second acceptable latency to a second L1 execution instance, when a first acceptable latency is lower than the second acceptable latency when a first L1 execution instance is capable of performing L1 processing faster than a second L1 execution instance, and wherein allocating respective L1 execution of the non-overlapping parts of the single radio resource unit comprises, and allocating L1 execution of a first part that carry data associated with a first acceptable latency to the first L1 execution instance;

allocating L1 execution of a fourth part that carry data associated with a fourth acceptable latency to a fourth L1 execution instance, when a third acceptable latency is lower than the fourth acceptable latency when a third L1 execution instance is logically closer to a radio unit of the communication node than a fourth L1 execution instance, and wherein allocating respective L1 execution of the non-overlapping parts of the single radio resource unit, and allocating L1 execution of a third part that carry data associated with a third acceptable latency to the third L1 execution instance;

disabling one or more of the L1 execution instances when a traffic load of the communication node falls below a load threshold value;

disabling one or more of the L1 execution instances comprises disabling L1 execution instances having a highest power consumption among the two or more L1 execution instances; and disabling one or more of the L1 execution instances comprises disabling L1 execution instances that utilize hardware usable, during L1 execution of the single radio resource unit, for other radio resource unit processing purposes than L1 execution.

7. The apparatus of claim 6, wherein the controller is further configured to cause determination of non-overlapping parts of the single radio resource unit by at least one of:

letting sub-units of the single radio resource unit that carry data of a same content service belong to a same part of the single radio resource unit; and letting sub-units of the single radio resource unit that carry data of different content services belong to different non-overlapping parts of the single radio resource unit.

8. The apparatus of claim 6, wherein the controller is further configured to cause determination of non-overlapping parts of the single radio resource unit by at least one of:

letting sub-units of the single radio resource unit that carry data of a same communication device belong to a same part of the single radio resource unit; and letting sub-units of the single radio resource unit that carry data of different communication devices belong to different non-overlapping parts of the single radio resource unit.

9. The apparatus of claim 6, wherein the controller is further configured to cause determination of non-overlapping parts of the single radio resource unit by at least one of:

letting sub-units of the single radio resource unit that carry data of a same logical channel belong to a same part of the single radio resource unit; and letting sub-units of the single radio resource unit that carry data of different logical channels belong to different non-overlapping parts of the single radio resource unit.

10. The apparatus of claim 6, further comprising one or more of the L1 execution instances.

11. The apparatus of claim 6, wherein the apparatus is comprised in a communication node.

* * * * *